United States Patent
Zhang et al.

(10) Patent No.: US 8,944,698 B2
(45) Date of Patent: Feb. 3, 2015

(54) COMPACT, TUNABLE, SUBMERSIBLE DRY MATE N-PIN OPTICAL CONNECTOR

(71) Applicant: Princetel Inc., Hamilton, NJ (US)

(72) Inventors: Boying B Zhang, Lawrenceville, NJ (US); Hong Zhang, North Brunswick, NJ (US); Louis D Violante, Monroe, NJ (US)

(73) Assignee: Princetel Inc., Hamilton, NJ (US)

( * ) Notice: Subject to any disclaimer, the term of this patent is extended or adjusted under 35 U.S.C. 154(b) by 0 days.

(21) Appl. No.: 13/914,895

(22) Filed: Jun. 11, 2013

(65) Prior Publication Data

US 2014/0363128 A1    Dec. 11, 2014

(51) Int. Cl.
*G02B 6/38* (2006.01)

(52) U.S. Cl.
CPC ............ *G02B 6/3869* (2013.01); *G02B 6/3816* (2013.01)
USPC .......................................................... 385/62

(58) Field of Classification Search
CPC ... G02B 6/3816; G02B 6/3875; G02B 6/3894
USPC ............................................................ 385/62
See application file for complete search history.

(56) References Cited

U.S. PATENT DOCUMENTS 5,265,182 A * 11/1993 Hartley ............................ 385/77
5,590,229 A * 12/1996 Goldman et al. ............... 385/59

FOREIGN PATENT DOCUMENTS

EP    0118804 A2 *    9/1984    ............... G02B 7/26
GB    2000323 A *    1/1979    ............... G01B 5/16

* cited by examiner

*Primary Examiner* — Ryan Lepisto

(57) ABSTRACT

A multi-pin connector with a small envelop and low insertion loss capable of operating while submerged is described within. This configuration avoids the tolerance stack up troubles that has plagued other similar designs thereby allowing it to achieve a low insertion loss without the typical cost drivers of tighter tolerances. In addition this invention incorporates as relatively simple method of tuning each pair of connectors thereby further reducing the insertion loss for each matched pair.

3 Claims, 3 Drawing Sheets

DETAIL F
SCALE 5 : 1

COMPACT, TUNABLE, SUBMERSIBLE DRY MATE N-PIN OPTICAL CONNECTOR

BACKGROUND OF INVENTION

Wet and dry optical connectors have been around for many years. However, while dry optical connectors have made significant improvements in both performance and cost; wet optical connectors have made comparably little progress. The tolerances needs for to ensure a quality fluid seal along with the precise placement need for a low loss optical connection has led to tolerance stack up issues making these type of connectors relatively large, expensive and still lacking the desired performance. By partially decoupling the position of the ferrules and the position of the outer shell this embodiment reduces manufacturing costs, while increasing performance and decreasing the body diameter.

DESCRIPTION OF THE INVENTION

Figure 1A:
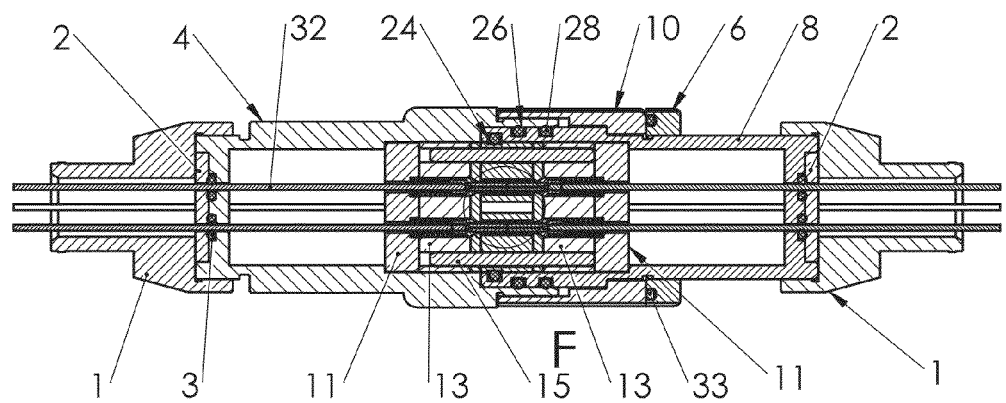
FIG. 1a—Main connector assembly, showing a mated male and female connector
FIG. 1b—Enlarged view of the optical interface within the main assembly
FIG. 2—Ferrule Assembly
FIG. 3—Ferrule Bundle Assembly
FIG. 4—indexed front plate
Figure 1B:
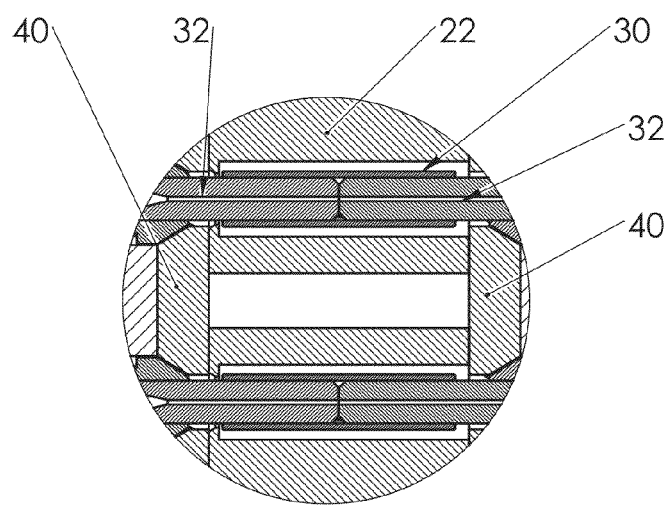

The one possible configuration of the main connector assembly is pictured in FIG. 1a. This configuration consists of end caps (1), o-ring plates (2), a female housing (4), a male housing (8), and a plurality of o-rings (3) between the o-ring plates (2) and the housings (4 and 8) creating an environmental seal between the surrounding environment and the connector internals. Additional environmental seals are forms between the female housing (4) and the male housing (8) by o-rings (26 and 28). A securing devices/mechanism (24), secures the sleeve holder (22) in the male housing (8). The sleeve holder (22) contains a plurality of split sleeves (30) within which is the optical interface between ferrule assemblies (32), detailed in FIG. 2, from the male and female housings (8 and 4 respectively). The ferrule assembly (32) from the female housing (4) are aligned with the ferrule assemblies (32) in the male housing (8) with the aid of the alignment pins (15). The split sleeves (30) are "floating" within the sleeve holder (24) in so much as they are capable of making subtle shifts in their physical position to align opposing ferrules (39) with slight mismatches in position. A threaded nut (10) engages the female housing (4) to ensure full engagement of the two halves of the connector. A second nut (6) and o-ring (33) is used as an anti-vibration lock to prevent the primary nut (10) and the female housing (4) from accidentally disengaging.

Figure 3:
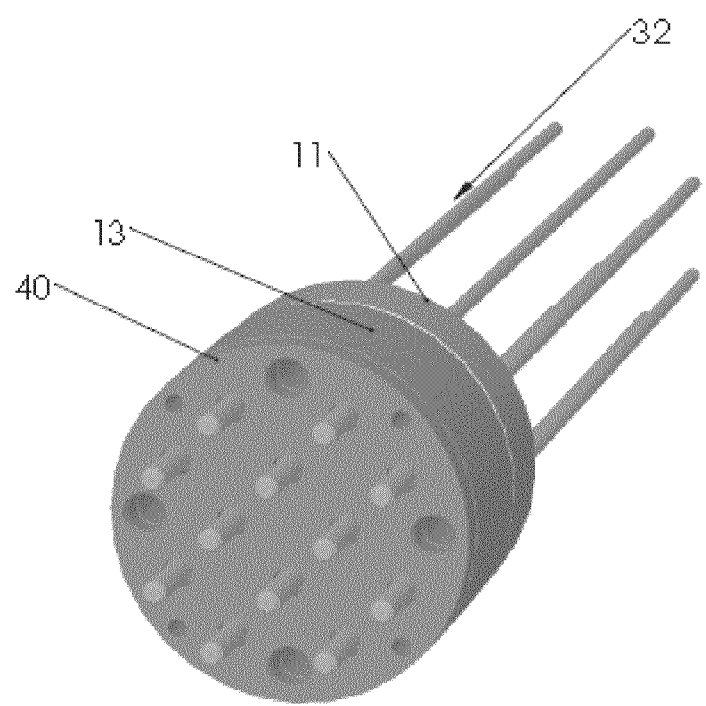

One possible alternate configuration is to eliminate the o-ring (24) between the sleeve hold (22) and the male housing (8) and make the sleeve holder (22) from a polymeric material or like material that would function as an environmental seal between it and the male housing (8) as well as ferrule bundle assemblies, which are detailed in FIG. 3, when under compression.

Figure 2:
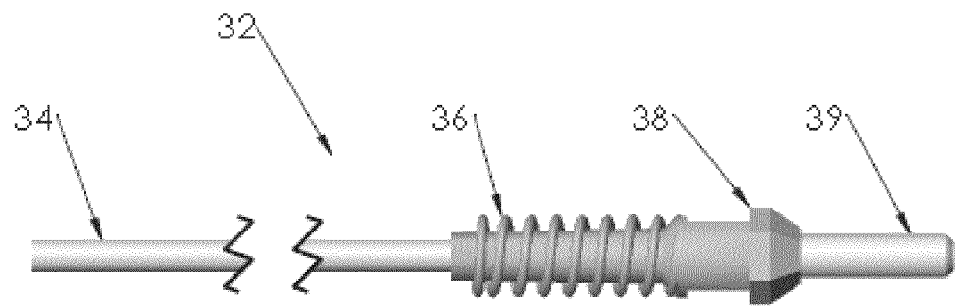

One possible configuration of the ferrule assembly is detailed in FIG. 2. In this configuration, each ferrule assembly consists of an optical fiber (34), a spring (36), a ferrule holder (38) and a ferrule (39), which is secured into said ferrule holder (38). The springs (36) of opposing fiber assemblies (32) become partially or fully loaded when the opposing ferrules (39) come into physical contact with each other. This ensures a good optical connection. The front of each ferrule holder (38) is a multisided figure with a matching multisided hole in the front plant (40). This will allow the each ferrule assemble (32) to be rotated compensating for any off center alignment of the fiber, with respect to the matching ferrule assembly, thereby further reducing the insertion loss of the matched pair. The ferrule assemblies are housed within the ferrule bundle assembly.

A possible configuration for the ferrule bundle assembly is pictured in FIG. 3. This configuration contains a plurality of ferrule assemblies (32), a back plate (11), a ferrule assembly holder (13), and a front plate (40). The back plate (11) provides a back stop for the sprint (36) in the ferrule assembly (32) but allows the ferrule holder (38) to pass unimpeded. Thereby loading the spring (36) when an axial force is placed on the tip of the ferrule assembly (32). The ferrule assembly holder (13) guides the ferrule assemblies (32) axial movement when an axial force is placed on its tip. The front plate (40) stops the forward movement of the ferrule assembly (32) when the axial force is released from the ferrule tip. In addition, the front plate (40) defines the placement and orientation of ferrule (39) ensuring smooth mating within the split sleeve (30).

Figure 4:
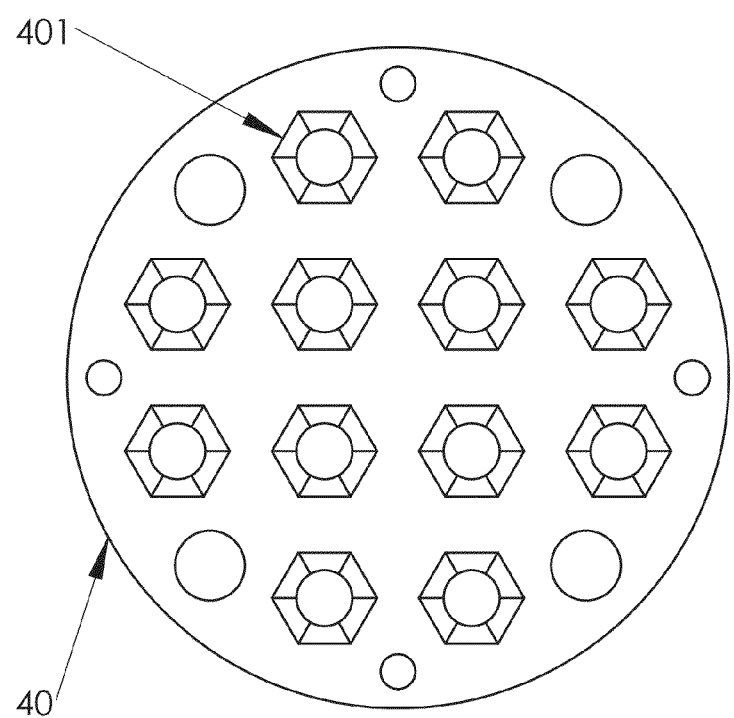

A possible configuration of the front plate (40) is pictured in FIG. 4. In this configuration each ferrule opening is in the center of a counter sinkhole shape like a polygon (401). This polygon counter sinkhole (401) matches and mates with the front of the ferrule holder (38). The ferrule (39) can be rotated by some number of degrees, which has been predetermined by the specific polygon chosen. For example a square would allow the ferrule to be rotated in 90 degree increments; a hexagon would allow rotation in 60 degree increments and so on. In an ideal configuration rotating the ferrule would have no impact on the performance of the connector. However, in real world applications we see that slight eccentricities in the ferrules (39), the fibers (34) and the split sleeves (30) contribute to the loss in all optical connectors. This particular configuration enables the user to rotate each ferrule to determine the orientation which minimizes these factors for each matted pair; thereby, further reducing the loss. It should be noted that there are a variety of rotating, indexing and locking methods; involving more complex shapes and/or gears which can be used to achieve the same end result described herein.

The invention claimed is:
1. An multi-channel optical connector capable of operating while submerged in a fluid comprising:
   a plurality of optical fibers;
   a pair of end caps with an environmental seal around said optical fibers;
   a male housing and a female housing;
   a lock nut securing said male housing to said female housing;
   a plurality of environmental seals between said males housings and said female housing;
   a plurality of floating split sleeves;
   a plurality of alignment pins;
   a pair of ferrule bundle assemblies each consisting:
   a front plate;
   a back plate;
   a ferrule assembly holder;
   wherein one ferrule bundle assembly is secured in said male housing and the other ferrule bundle assembly is secured in said female assembly; and
   a plurality of ferrule assemblies secured in said ferrule bundle assemblies;

said ferrule assembly further consisting:
a ferrule holder;
a ferrule being secured in said ferrule holder;
a spring around the body of said ferrule holder; and
said optical fiber being secured within said ferrule.

2. A multi-channel tunable optical connector consisting:
a pair of end caps;
a male housing and a female housing;
a lock nut securing said male housing to said female housing;
a plurality of floating split sleeves;
a plurality of alignment pins;
a pair of ferrule bundle assemblies each consisting:
a front plate;
a back plate;
a ferrule assembly holder;
wherein one ferrule bundle assembly is secured in said male housing and the other ferrule bundle assembly is secured in said female assembly; and
a plurality of ferrule assemblies secured in said ferrule bundle assemblies;
wherein each said ferrule assembly can be rotated to optimize its performance with a matching pair then secured in place;
said ferrule assembly further consisting:
a ferrule holder;
a ferrule which is secured in said ferrule holder;
a spring around the body of said ferrule holder; and
an optical fiber being secured within said ferrule.

3. An multi-channel optical connector capable of operating while submerged in a fluid consisting:
a plurality of optical fibers;
a pair of end caps with an environmental seal around said optical fibers;
a male housing and a female housing;
a lock nut securing said male housing to said female housing;
a plurality of environmental seals between said males housings and said female housing;
a plurality of floating split sleeves;
a plurality of alignment pins;
a pair of ferrule bundle assemblies each further consisting:
a front plate;
a back plate; and
a ferrule assembly holder;
wherein one ferrule bundle assembly is secured in said male housing and the other ferrule bundle assembly is secured in said female assembly;
a plurality of ferrule assemblies secured in said ferrule bundle assemblies;
wherein each said ferrule assembly can be rotated to optimize its performance with a matching pair then secured in place; said ferrule assembly further consisting:
a ferrule holder;
a ferrule being secured in said ferrule holder;
a spring around the body of said ferrule holder; and
an optical fiber being secured within said ferrule.

* * * * *